United States Patent

[11] 3,552,424

[72] Inventor Kenneth L. Thompson
 Huntington Beach, Calif.
[21] Appl. No. 818,658
[22] Filed Apr. 23, 1969
[45] Patented Jan. 5, 1971
[73] Assignee Ye Dock Master, Inc.
 a corporation of California

[54] FLOATING LIFT STATION
 12 Claims, 4 Drawing Figs.
[52] U.S. Cl. .................................................. 137/343,
 4/10; 114/0.5(F)
[51] Int. Cl. .................................................. F16l 5/00
[50] Field of Search .......................................... 214/12;
 114/0.5(F), 210/242; 4/10, 15; 137/344

[56] References Cited
 UNITED STATES PATENTS
 444,007   1/1891   Monjeau ...................... 210/242

| 3,131,542 | 5/1964 | Koch ............................ | 114/0.5F |
| 3,320,621 | 5/1967 | Vita ............................ | 4/10 |
| 3,442,385 | 5/1969 | Nash ............................ | 210/242 |
| 3,447,688 | 6/1969 | MacCabe ...................... | 210/242 |
| 3,455,115 | 7/1969 | Watts et al. .................. | 114/0.5f |
| 3,456,824 | 7/1969 | Smith .......................... | 214/12 |

FOREIGN PATENTS
 221,874   5/1910   Germany ...................... 210/242

Primary Examiner—Samuel Scott
Attorney—Nilsson and Robbins

ABSTRACT: A sewer system for a floating wharf utilizing a floating lift station. Means are provided for gravity feeding sewage from a plurality of floating boat slips to a floating holding tank at the lift station, and means are provided for transferring sewage from the holding tank to a main sewage conduit.

PATENTED JAN 5 1971

3,552,424

INVENTOR.
KENNETH L. THOMPSON
BY
Nilsson & Robbins
Attorneys

FLOATING LIFT STATION

BACKGROUND OF THE INVENTION

1. Field of the Invention

The fields of art to which the invention pertains include the field of sewerage and the field of ships, particularly floating docks therefor.

2. Description of the Prior Art

In constructing marinas or small boat harbors it is often desirable to utilize a floating wharf structure which is accessible to land and has one or more fingers extending out into the body of water. At certain facilities, it often occurs that the boater remains in a boat slip for an extended period of time during which time he lives on the boat. Under such circumstances, the boater requires sewage disposal facilities and it is desirable to provide such facilities, or access to such facilities at the boat slip. However, the provision of sewage disposal facilities on a floating wharf structure presents problems of construction which have heretofore generally limited the availability of sewage disposal facilities to nonfloating structures or to limited access areas.

SUMMARY OF THE INVENTION

The present invention provides a sewage disposal system for a floating wharf structure which allows access thereto from any of a plurality of boat slips associated with the wharf structure. In particular, a sewer system for a floating wharf is provided, comprising: a main sewage conduit at a first level; a floating tank for holding sewage below the first level; means for feeding sewage from a plurality of floating boat slips to the holding tank; and means for transferring sewage from the holding tank to the main sewage conduit. The sewage feeding means comprises a feed conduit having an intake port and an exhaust, the intake port being at a level higher than the sewage in the holding tank. Means are provided for connecting the exhaust of the feed conduit to the holding tank whereby sewage introduced into the feed conduit is gravity fed to the holding tank. An intake port is provided at each of a plurality of boat slips, each such intake port being at a level higher than the sewage in the holding tank, to receive sewage from said boat slips and gravity feed it to the holding tank.

The holding tank is secured in a substantially fixed lateral position with respect to the wharf but is allowed to move vertically. In particular, the holding tank is slidably disposed on rigid means extending downwardly from the wharf structure, and means are included for limiting the extent of its downward movement. The holding tank includes intake and exhaust ports for connection to the exhaust of the feed conduit and to the main sewage conduit, respectively, and is connected thereto by means of flexible conduit whereby the holding tank is essentially free-floating within limits of such flexure.

DETAILED DESCRIPTION

Figure 1:
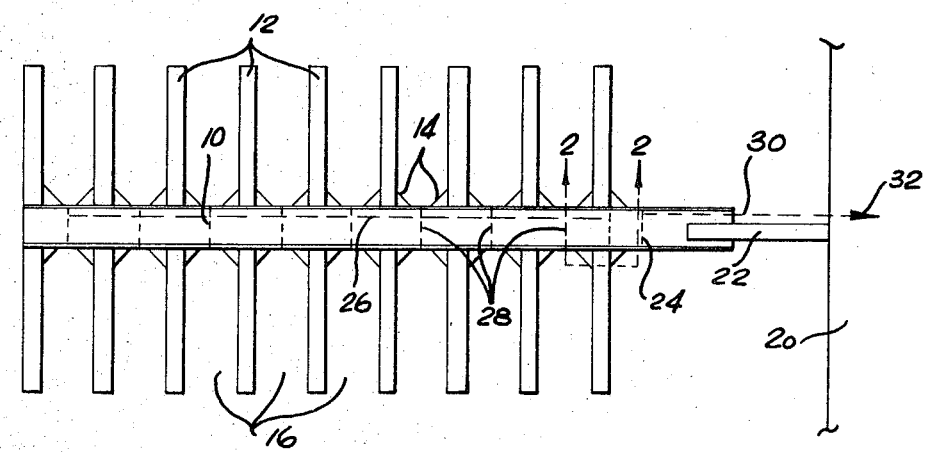
FIG. 1 is a plan view of a floating wharf structure utilizing a sewer system of this invention.

Referring to FIG. 1, there is illustrated a floating wharf structure, including a headwalk 10 and a plurality of finger sections 12 connected to the headwalk by means of corner sections 14. The headwalk 10, finger sections 12 and corner sections 14 define a plurality of boat slips 16 along both sides of the headwalk 10 and constitute a floating wharf structure. The structure is supported on pontoons 18 (FIG. 2) and is connected to a land structure 20 by means of a ramp 22 extending from one end of the wharf structure to the land structure 20. The sewer system in accordance with this invention is shown by dashed lines in FIG. 1 and includes a lift station 24 into which sewage is fed by means of a feed conduit 26 extending lengthwise of the headwalk 10 which, in turn, is fed by a plurality of branch conduits 28. The branch conduits are disposed so that each boat slip 16 has a branch conduit 28 associated therewith. Sewage is gravity fed into the lift station and, as hereinafter described, is then pumped into a main sewage conduit 30 which leads into the main sewer line as indicated by the arrow 32. In operation, a boater connects the disposal system of his boat into the branch sewer conduit 28 located at the slip in which his boat is docked. Upon disposing of his sewage, it is gravity fed via the feed conduit 26 into the lift station 24, and from there it is pumped into the main sewage conduit 30.

Figure 2:
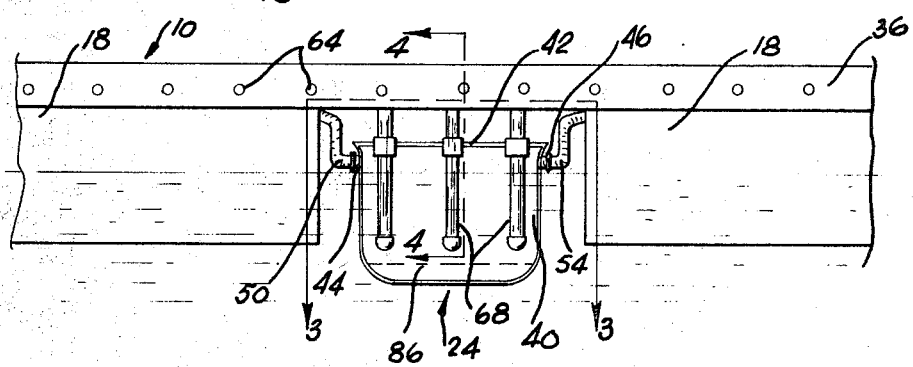
FIG. 2 is an elevational view of a lift station of this invention utilized in the structure of FIG. 1, taken on the line 2—2 of FIG. 1, in the direction of the arrows.

Referring to FIG. 2, an elevational view of the lift station 24 and details of construction of the wharf structure are shown. The headwalk 10 is seen to overlie a plurality of pontoons 18 (of which only two are shown) which are interconnected by means of a deck 34 (FIG. 4) common thereto and by a pair of oppositely disposed 3 inches times 8 inches stringers 36 and 38 (FIG. 3) bridging the pontoons 18.

Figure 3:
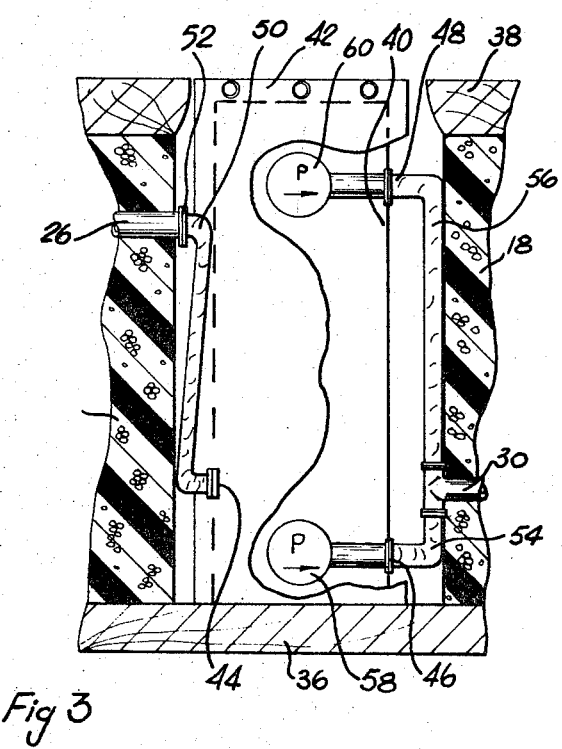
FIG. 3 is a partially cutaway, horizontal-sectional view of the lift station depicted in FIG. 2, taken on line 3—3 of FIG. 2, in the direction of the arrows.

The key structure in the lift station 24 is a holding tank 40 constructed of fiberglass or other waterproof, light but strong material. Referring additionally to FIG. 3, the holding tank 40 is provided with a cover 42 closely fit thereto, an intake port 44 and, in this case, a pair of exhaust ports 46 and 48. A relatively short length of flexible tubing 50 connects the intake port to the exhaust 52 of the feed conduit 26 noted above. Other relatively short lengths of flexible tubing 54 and 56 connect the exhaust ports 46 and 48, respectively, to the main sewage conduit 30. A pair of submersible pumps 58 and 60 are disposed on the bottom of the holding tank 40 and connect respectively to the exhaust port flexible tubing sections 54 and 56, into the main sewage conduit 30.

An important feature of this invention is that, within the limits of flexure of the tubing 50, 54 and 56, the holding tank 40 is substantially free-floating in the vertical direction, but is laterally restrained so that horizontal displacement is prevented.

Figure 4:
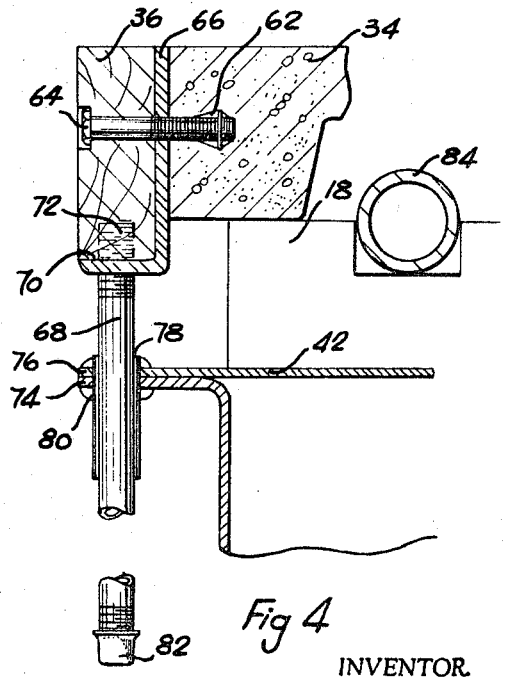
FIG. 4 is a broken, enlarged vertical-section view of a portion of the wharf structure and lift station depicted in FIG. 2, taken on line 4—4 of FIG. 2, in the direction of the arrows.

Referring to FIG. 4, there is disclosed the manner in which the holding tank 40 is allowed to free-float, and other details of construction of the floating wharf are illustrated. The headwalk 34 of the floating wharf is constructed of cast concrete and has embedded therein a plurality of threaded nuts, such as that shown as 62 to enable fastening thereat of the stringer 36 by means of a bolt 64 therethrough; a plurality of such bolts 64 are shown in FIG. 2. A metal, L-shaped beam 66 is disposed between the stringer 36 and the side of the concrete headwalk 34 and serves to strongly support lateral guide members 68 extending downwardly therefrom. The horizontal, lower leg of the L-shaped beam 66 defines threaded openings therethrough aligned with apertures 72 in the stringer 36 for threadably receiving and retaining therein the threaded ends of the lateral guide members 68. Referring back to FIG. 2, sets of three such guide members 68 are disposed on opposite sides of the holding tank 40. The holding tank 40 is provided with a flared lip 74 which is coextensive with the rim 76 of the holding tank cover 42. An aperture 78 is formed through the coextensive lip 74 and rim 76 and is reinforced with a short section of steel pipe 80 welded thereto. The lateral guide members 68 are each of an elongate cylindrical configuration and extend through the piping 80 so as to be slidably disposed therein. In this particular embodiment, the guide members 68 are constructed of 1½-inch stainless steel pipe and the reinforcing pipe 80 is of 1¾-inch stainless steel pipe. A stop cap 82 is threadably secured on the threaded lower end of each guide member 68 to thereby limit downward movement of the holding tank 40.

In operation, the holding tank 40 is disposed beneath the walkway 34 between a pair of pontoons 18, and beneath any utility lines such as shown at 84 which are supported by the pontoons 18. The holding tank 40 is limited in its lateral movement by means of the guide members 68. However, the guide members 68 allow the holding tank 40 to otherwise freely-float on the water. Solid ballast is provided (shown by the dashed line 86 in FIG. 2) so as to cause the holding tank 40 to float at a minimum distance below the headwalk 34. The walkway 10 is pitched at a small angle as a result of the weight of the gang plank 22 so that the feed conduit 26 is pitched slightly towards the lifting station 24. Sewage is introduced into the feed conduit 26 through a branch conduit 28 and is gravity fed, via the flexible tubing 50, into the holding tank intake port 44. As more sewage is introduced, the holding tank 40 submerges as the result of the increased ballast therein until a point is reached wherein the pumps 58 and 60 are automatically actuated. Any means known to the art can be utilized to actuate the pumps in response to an increase of volume of sewage in the holding tanks; for example, a simple float-ball system can be utilized. Upon actuation, the pumps 58 and 60 transfer the sewage from the holding tanks through its exhaust ports 46 and 48, via the respective flexible tubing sections 54 and 56, into the main sewage conduit 30 from where it travels to the land-located main sewer line. It will be seen that as the holding tank 40 is lowered and raised on the guided member 68 as a result of first filling and then emptying, no deleterious effect is manifested on the floating wharf structure since the holding tank 40 moves substantially independently of the wharf.

I claim:
1. A sewer system for a floating wharf, comprising:
a main sewage conduit;
a floating tank for holding sewage below a first level;
a plurality of floating boat slips;
means for feeding sewage from said boat slips to said holding tank; and
means for transferring sewage from said holding tank to said main sewage conduit.
2. The system of claim 1 wherein said transferring means comprises a pump which is automatically actuated when said sewage in said holding tank reaches a predetermined level therewithin to pump said sewage into said main sewage conduit.
3. The system of claim 1 including means for securing said holding tank in substantially fixed lateral position with respect to said wharf but allowing said holding tank to move vertically with respect to said wharf.
4. The system of claim 1 wherein said holding tank is disposed beneath said wharf structure, and including rigid means extending downwardly from said wharf structure and disposed in slidable relation with said holding tank.
5. The system of claim 1 including a flexible conduit between said holding tank and said sewage feeding means and a flexible conduit between said holding tank and said main sewage conduit, whereby said holding tank can float between predetermined limits of flexure of said conduits.
6. The system of claim 1 including ballast means in said holding tank for limiting the upward floating level thereof.
7. A system of claim 1 wherein said sewage feeding means comprises a feed conduit having an intake and an exhaust, said intake being at a level higher than said first level, said sewer system including means for connecting said feed conduit exhaust to said holding tank whereby sewage introduced into said feed conduit is gravity fed to said holding tank.
8. The system of claim 7 wherein said feed conduit has an intake port at each of a plurality of said boat slips for enabling said feed conduit to receive sewage therefrom, each of said intake ports being at a level higher than said first level.
9. A floating lift station, comprising:
a tank for holding sewage and including means defining intake and exhaust ports thereof;
means for transferring sewage from said tank through said exhaust port; and
rigid means disposed in slidable relation with said tank for limiting lateral movement thereof.
10. The lift station of claim 9 wherein said transferring means comprises a pump which is automatically actuated when said sewage in said holding tank reaches a predetermined level to pump said sewage through said exhaust port.
11. The lift station of claim 9 including flexible conduits on said intake and exhaust ports whereby said holding tanks can substantially free-float between predetermined flexure limits.
12. The lift station of claim 9 including means for limiting downward movement of said tank.